(No Model.) 2 Sheets—Sheet 2.

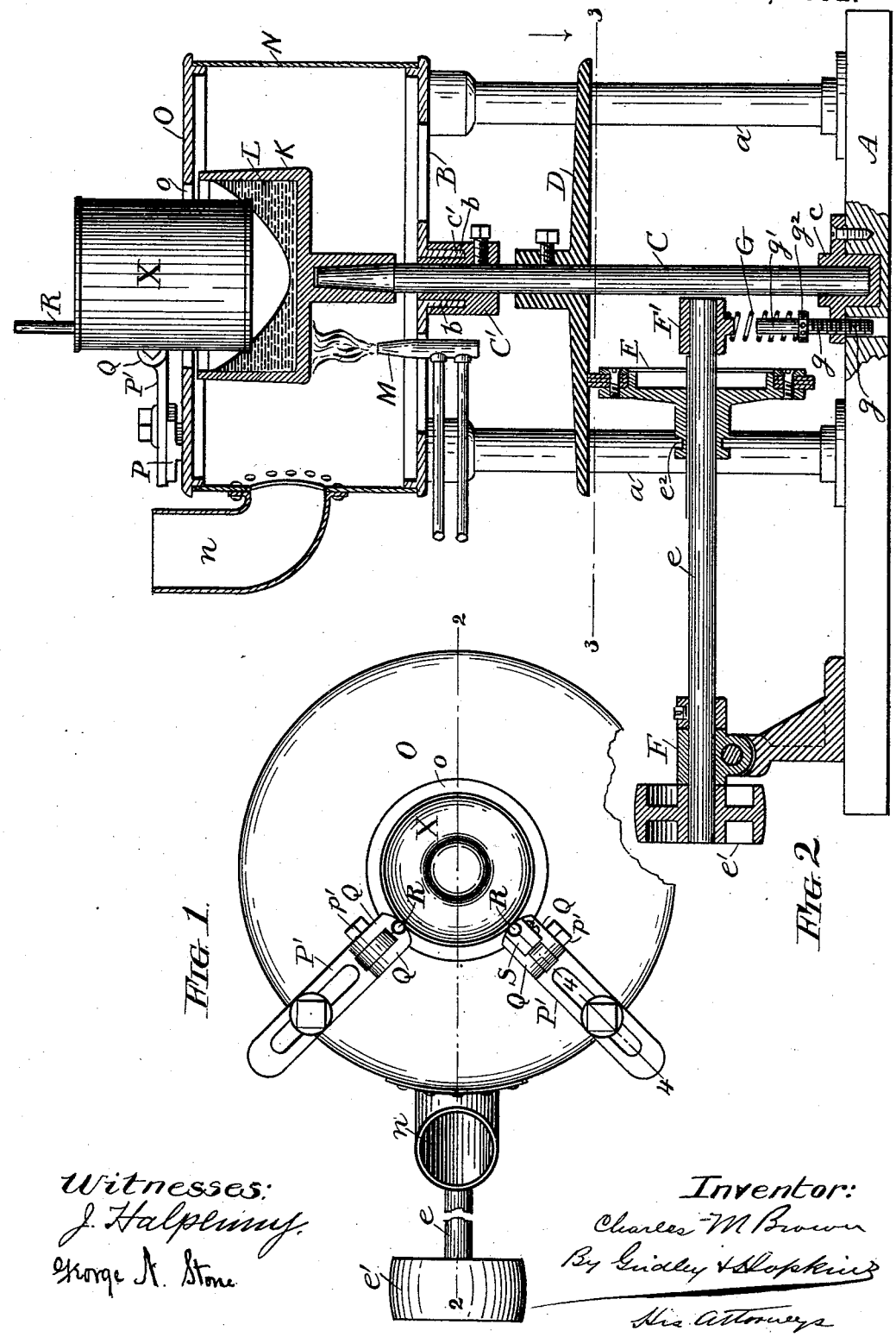

C. M. BROWN.
PROCESS OF AND MACHINE FOR SOLDERING.

No. 485,907. Patented Nov. 8, 1892.

Witnesses:
J. Halpenny
George N. Stone

Inventor:
Charles M. Brown
By
Dudley & Hopkins
His Attorneys.

UNITED STATES PATENT OFFICE.

CHARLES M. BROWN, OF CHICAGO, ILLINOIS.

PROCESS OF AND MACHINE FOR SOLDERING.

SPECIFICATION forming part of Letters Patent No. 485,907, dated November 8, 1892.

Application filed December 19, 1891. Serial No. 415,624. (No model.)

*To all whom it may concern:*

Be it known that I, CHARLES M. BROWN, a citizen of the United States, residing at Chicago, in the county of Cook and State of Illinois, have invented certain new and useful Improvements in the Process of and Machines for Soldering, of which the following is a specification.

The object of the present invention is to provide a process and machine by which soldering may be done more rapidly than according to old methods and with old machines.

The process to which the present invention relates has some features in common with a process that is described and claimed in my application of even date herewith, Serial No. 415,623; and the process in which the present invention resides (so far as it relates to the process) consists in imparting swift rotary motion to the molten solder, so that its surface will assume a concave form, and dipping the article thereinto so that the marginal joint to be soldered will be immersed, but the bottom of the article kept out of contact, either wholly or in greater part.

So far as said invention relates to the machine for carrying out this process it consists in certain features of novelty that are particularly pointed out in the claims.

In order that the several features of my invention may be fully understood, I will proceed to describe them with reference to the accompanying drawings, which are made a part hereof, and in which—

Figure 3:
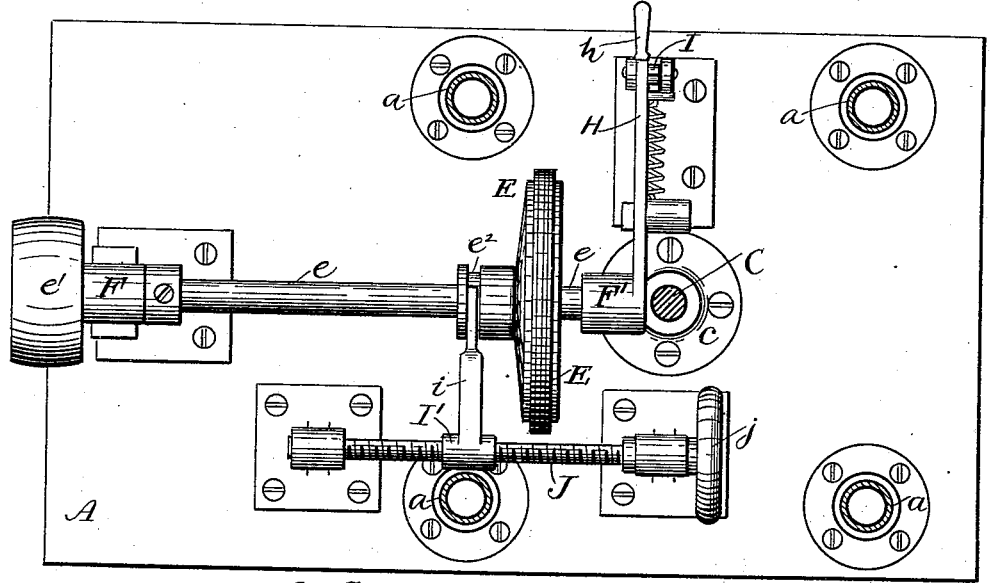
Figures 5, 6:
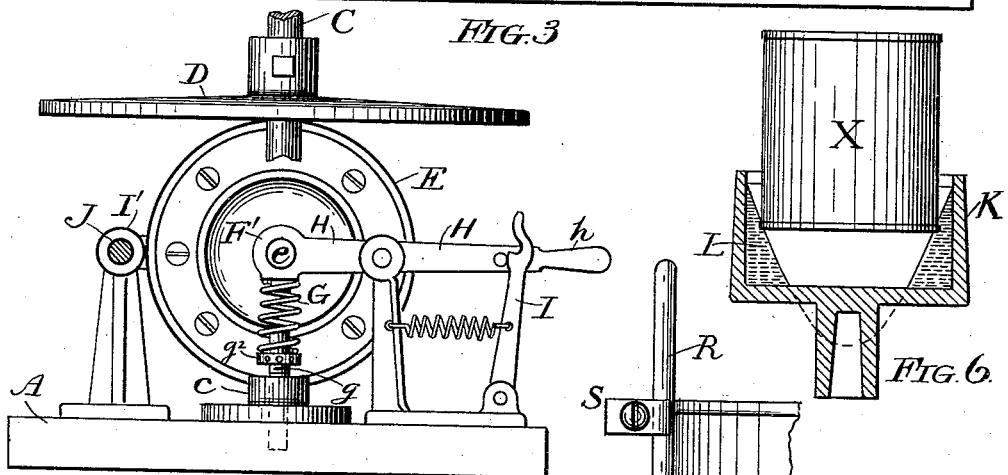
Figure 4:
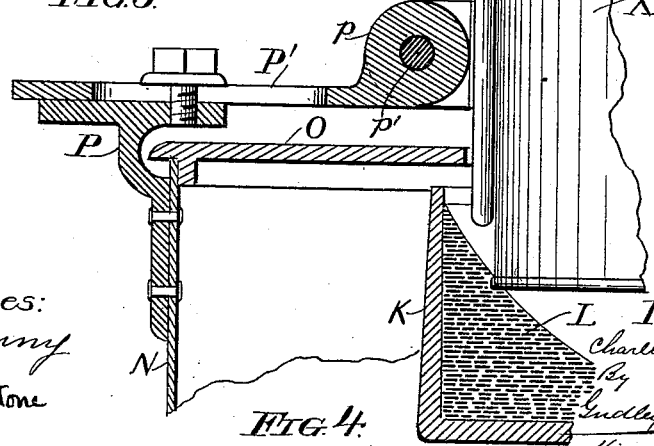

Figure 1 is a plan view of an improved machine for carrying out the improved process. Figs. 2 and 3 are a vertical and a horizontal section thereof on the lines 2 2, Fig. 1, and 3 3, Fig. 2, respectively. Fig. 4 is a vertical section of some of the parts on a larger scale on the line 4 4, Fig. 1. Fig. 5 is an elevation of some of the parts hereinafter particularly described. Fig. 6 is a vertical section of the solder bath and an elevation of a cylindrical vessel immersed therein in position for soldering the bottom to the body.

A represents a base-plate, from which rise four (more or less) posts $a$, surmounted by a spider B, having a central opening surrounded by an annular flange $b$, which extends downward.

C is a spindle turning at its lower end in a step $c$, and C' is a collar secured to said spindle by a set-screw and having an annular groove $c'$, which receives the flange $b$ and also forms a cup for holding the lubricant, and thereby insuring the proper lubrication of the spindle. Secured to the spindle, preferably by means of a set-screw, so as to be adjustable thereon, is a disk D, beneath which is arranged a brush-wheel E, secured to a shaft $e$, having a pulley $e'$ for receiving the driving-belt. The shaft $e$ is journaled near one end in a rocking bearing F and near the other in a movable bearing F', which is kept normally elevated, so that the brush-wheel is in frictional contact with the disk D, by means of a coiled spring G, the tension of which may be regulated by a screw $g$, having a stud $g'$, that enters the spring for holding it in place, and a shoulder $g^2$, on which the spring bears. The bearing F' is carried by a lever H, having a handle $h$, by which it may be moved, a spring-actuated dog I being so arranged that when said lever is so placed that the brush-wheel is out of contact with the disk D said dog will automatically engage and lock said lever. The brush-wheel E and shaft $e$ are connected by a spline and groove, so that the wheel may slide longitudinally upon the shaft, and the hub of the wheel has an annular groove $e^2$, in which fits the bifurcated end of an arm $i$, that projects from a nut I', through which passes an endless screw J, having a hand-wheel $j$ for turning it. By turning the hand-wheel $j$ the position of the brush-wheel E on its shaft may be changed so that it will have contact with the disk D at any desired distance from its spindle. By this means the speed of the spindle C may be regulated. Secured to the upper end of the spindle is a cup K, containing solder L, which is kept in a molten state by means of a Bunsen burner M or other suitable heating device, the cup and burner being inclosed in a heat-confining drum N, which rests upon the spider B, and has a stack $n$ for the escape of the products of combustion. The drum preferably extends slightly above the top of the solder-cup, and upon it rests a cover O, having a central opening $o$, of somewhat smaller diameter than the cup, so as to project inward over the margin thereof.

Motion imparted to the pulley $e'$ will be transmitted to the solder-cup K through the medium of the shaft e, brush-wheel E, disk D, and spindle C, the speed of the cup being regulated by adjusting the brush-wheel as already described. The solder L will of course partake of the motion of the cup, and being in a fluid state the centrifugal force will cause its surface to assume a concavity of greater or less extent, according to the speed at which the cup is revolving and the consequent centrifugal force. By using a cup of the proper size and properly regulating the rapidity of its rotation the surface of the solder can be given such a slope or inclination that a can X or other vessel may be held with its bottom horizontal and immersed in it for the required distance without bringing the whole area of its bottom in contact with the solder. The slope may be such that the solder will bathe both the side and the bottom to about the same extent, as shown by Fig. 2, or by increasing the velocity the slope may be made so great that the solder will scarcely touch the bottom, as shown by Fig. 6.

According to one old method of soldering a small quantity of solder is placed upon a horizontal disk, which is slightly concave on top and beneath which are the burners. The article is immersed in the solder until it comes in contact with the disk and is so held for an instant, the disk being slowly revolved the while. This machine is, in fact, a rotary soldering-iron, and its operation depends upon actual contact of the article with the disk. The disk cannot be revolved fast enough to give the surface of the solder the necessary concave form, and consequently, unless the end of the article is countersunk, its entire surface will be coated with solder if the quantity used is anything more than barely enough to give the disk a mere coating. Furthermore, it is available only when the seam or joint is at the very extremity of the body of the article, and not when the seam is at the side.

The advantages of my method are that it is quicker, the gain in speed being due partly to the fact that where there is a swift relative movement between the article and solder the solder takes hold of the metal quickly, it is available where the seam is at the side of the article, and it does not coat the entire surface of the bottom of the can, even when the bottom is perfectly flat and unsunken.

The term "cup" as used in this specification is thus distinguished from a disk the upper surface of which is slightly concave. They are not equivalents.

So far as I am aware I am the first to solder by immersing the article to be soldered in molten solder which is kept in swift motion whatever may be the direction in which it moves or the means for moving it, and I am in like manner the first to cause the surface of the solder to slope. I have shown and described in this application what I believe to be the best means for accomplishing these results where the article to be soldered is round; but in my other application, above mentioned, I have shown and described means for accomplishing these results and applying the principles which they involve in soldering articles of any shape, be they curved or angular, regular or irregular. In said application, instead of dipping the article into solder which is in rotary motion, the solder is caused to flow from a higher to a lower level, and the joint to be soldered is dipped in the flowing solder, as will more fully appear by reference to said application.

It is my intention that the generic features of the processes described in both of these applications shall be claimed in the aforesaid application, Serial No. 415,623, and that the claims in this one shall not include anything that is common to both.

One object of the cover O is to confine the heat about the solder-cup and another is to catch any solder that may escape over the margin of the cup and be thrown off by centrifugal force. P are brackets, to each of which is secured, preferably by bolts, a radially-adjustable slide P', having at its inner end a perforated ear p, to the opposite sides of which are secured by a bolt p' a pair of clamp-plates Q, having grooved opposing faces for receiving a vertical guide-rod R. The rods R are thus held adjustably and to each is adjustably secured a guide S for marking the distance to which the can should be inserted.

The machine may differ widely from the one shown in the drawings without departing from my invention, as the latter in its generic sense is not limited to the means shown for heating or revolving the solder-cup, nor is it limited to means for guiding the article being soldered or for catching the flying solder.

What I claim as new is—

1. The process of soldering consisting in placing a quantity of molten solder in a receptacle having high sides, imparting to the solder a swift rotary motion, causing its surface to assume a concave form and to slope to such an extent that an article having a flat unsunken bottom may be immersed therein far enough to submerge either a bottom seam or a side seam without bringing any considerable portion of its bottom in contact with the solder, and immersing the article in the sloping concave surface of the swiftly-moving molten solder until the joint to be sealed is submerged, but without bringing any considerable portion of its bottom in contact with the solder, substantially as described.

2. The process of soldering which consists in placing a quantity of molten solder in a cup having high sides, imparting to the cup a swift rotary motion, causing the surface of the solder to assume a concave form and to slope to such an extent that an article having a flat unsunken bottom may be immersed therein far enough to submerge either a bottom seam or a side seam without bringing any considerable portion of the bottom in contact with the solder, and immersing the article in the sloping concave surface of the swiftly-moving molten solder until the joint to be sealed is submerged, but without bringing any considerable portion of the bottom in contact with the solder and without bringing said bottom in contact with the solder-cup, substantially as set forth.

3. The combination of a solder-cup, means for rotating the cup, and a drum surrounding the cup for catching particles of solder that are thrown off by centrifugal force, substantially as set forth.

4. The combination of a solder-cup, means for rotating it, a drum surrounding said cup, and a cover resting on said drum and having an opening opposite the cup, substantially as set forth.

5. The combination, with a revoluble solder-cup and means for revolving it, of a guide situated so as to hold the article concentric with the cup while being soldered, substantially as set forth.

6. The combination, with a solder-cup and means for rotating it, of the vertical guide-rods R and means for adjusting them toward or from the center of motion of said cup, substantially as set forth.

7. The combination, with a solder-cup and means for rotating it, of the slides P', adjustable toward or from the center of motion of said cup, the clamp-plates Q, and the vertical rods R for centering the article, substantially as set forth.

8. The combination, with a solder-cup and means for rotating it, of means for centering the article and a guide S for indicating the distance to which it should be immersed, substantially as set forth.

9. The combination, with a solder-cup and means for heating it, of a vertical spindle to which said cup is secured and adjustable gearing for rotating said spindle at different speeds, substantially as set forth.

10. The combination, with the solder-cup and the vertical spindle C, of the disk D, the shaft $e$, the brush-wheel E, adjustable longitudinally on said shaft, and means for driving said shaft, substantially as set forth.

11. The combination, with the solder-cup and the spindle C, of the disk D, the shaft $e$, the brush-wheel E, splined thereto and having annular groove $e^2$, the endless screw J, the nut I' thereon, and the arm $i$, projecting from said nut and engaging the groove $e^2$, substantially as set forth.

12. The combination, with the solder-cup and the spindle C, of the disk D, the brush-wheel E, adapted to engage said disk, and means for moving said wheel out of contact with said disk, substantially as set forth.

13. The combination, with the solder-cup and the spindle C, of the shaft $e$, to which said wheel is secured, the movable boxes F F', in which said shaft is journaled, a spring for holding the box F' normally elevated, and means for transmitting motion from shaft $e$ to spindle C, substantially as set forth.

14. The combination, with the solder-cup and spindle C, of the shaft $e$, the box F', the lever H, by which said box is carried, the dog I, the spring G for holding the box normally elevated, and means for transmitting motion from the shaft $e$ to the spindle C when the former is in its elevated position, substantially as set forth.

15. The combination, with the vertical spindle C and means for rotating it, of the spider B, having the annular flange $b$, and the collar C', secured to the spindle and having the annular groove in which said flange fits, substantially as set forth.

CHARLES M. BROWN.

Witnesses:
L. M. HOPKINS,
J. HALPENNY.